Figure 1:
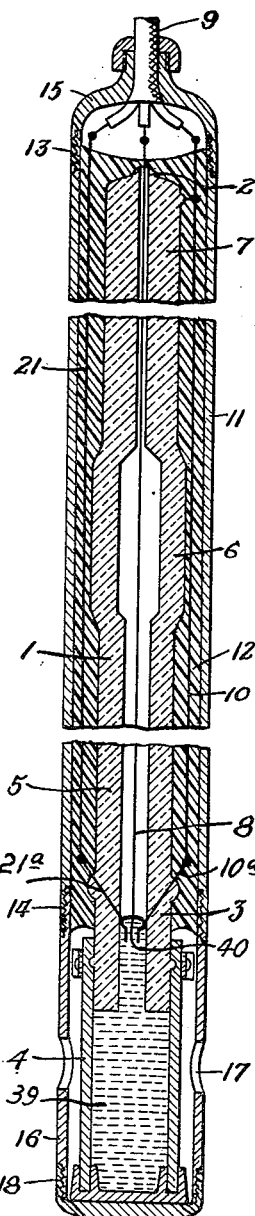

April 5, 1960

F. W. PLEUGER 2,931,225

INSTRUMENT FOR INDICATING OIL LEVEL, GROUND
PRESSURE AND TEMPERATURE IN AN OIL WELL
Filed Aug. 23, 1955

INVENTOR
Friedrich Wilhelm Pleuger
BY
Synnestvedt & Lechner
ATTORNEYS

United States Patent Office

2,931,225
Patented Apr. 5, 1960

2,931,225

INSTRUMENT FOR INDICATING OIL LEVEL, GROUND PRESSURE, AND TEMPERATURE IN AN OIL WELL

Friedrich Wilhelm Pleuger, Hamburg, Germany

Application August 23, 1955, Serial No. 530,136

Claims priority, application Germany August 24, 1954

7 Claims. (Cl. 73—300)

This invention is concerned with the art of exactly measuring and providing for constant observation of the oil level, the ground pressure and the temperature in an oil well, which factors are of decisive importance in drilling operations.

The principal object of the invention is to provide a single instrument for exactly determining and indicating, for the purpose of constant observation, the several factors referred to. Other objects of the invention will appear more fully hereinafter but before entering upon a detailed description of the invention it will be helpful to note the following prerequisites:

(1) Such measurement should provide for accurate indication of small pressures (heights of oil columns) so that the instrument or measuring device when suspended at the level of the oil pump will be able to indicate the height of the oil column above the pump—(range comprising heights between 0 and about 60 meters).

(2) Such measurements should also provide for accurate indication in those instances where the instrument is intended to measure exactly the pressure in the ground formation which, frequently, is of the order of the tenth power greater—(range between 300 and 800 meters).

(3) Because the length of the cables used for suspending the measuring device is often very great it is necessary, in order to save expense, to provide an instrument by means of which several measurements can be made simultaneously by employing a minimum number of cables.

(4) The equipment used in obtaining such measurements must be relatively small in order that the device can be lowered with ease through the bore of the well.

(5) It is also important to provide equipment the operation of which can be undertaken by relatively unskilled labor so that first costs and maintenance expenses can be kept as low as possible.

Of course, devices for the measurement of pressures are known such, for example, as the gas pressure gage in which pressure exerted upon a mercury sealed volume of gas is transcribed in a suitably calibrated pipe and the gas volume is compressed in inverse proportion by means of the pressure. As the pressure varies a resistor arranged in the pressure pipe is short-circuited to a greater or lesser extent by the mercury and the change in the resistance is electrically relayed across a line leading to an instrument where it can be read or is recorded in writing. The temperature at any given location has been determined with the aid of a temperature-responsive resistor which is also disposed in a sinker. Such schemes represent generally known methods of remote indication of pressure and temperature but, in their conventional forms or modifications, they are not suitable for application in oil well bores.

Therefore, measuring devices for use in oil drilling operations have been based on different principles which heretofore have not permitted measurement of all the afore mentioned factors at one time. For example, some instruments familiar to the art are suitable only for measuring the oil level. Moreover, their use requires great expenditures of both time and money because only skilled personnel can operate them due to the complex nature of the measurements and the preparatory study necessary to carry them out. The principle by which these known devices function is mostly that of echo sounding or of the employment of a vibrating string whose frequency is modified by the oil level.

In contrast to the foregoing, the object of the present invention is to provide an apparatus which will indicate not only the exact height of the oil level above any measuring point (e.g., the pump level), but also simultaneously record the temperature conditions at that level and both of these in such manner that their values can be continuously shown for reading or registered in writing, whereby it is possible to obtain reliable information about the factors required at the point about which the information is desired.

Figure 2:
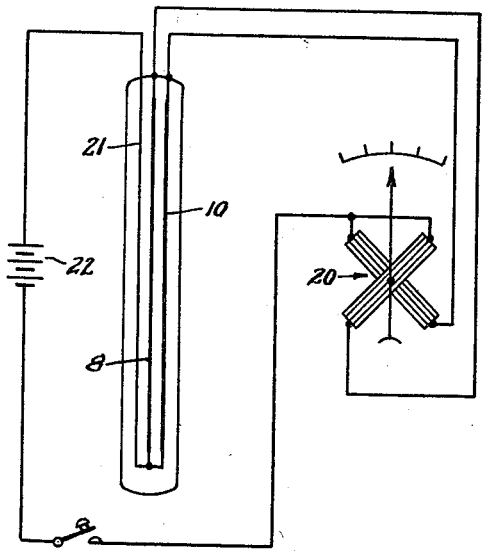
Figure 3:
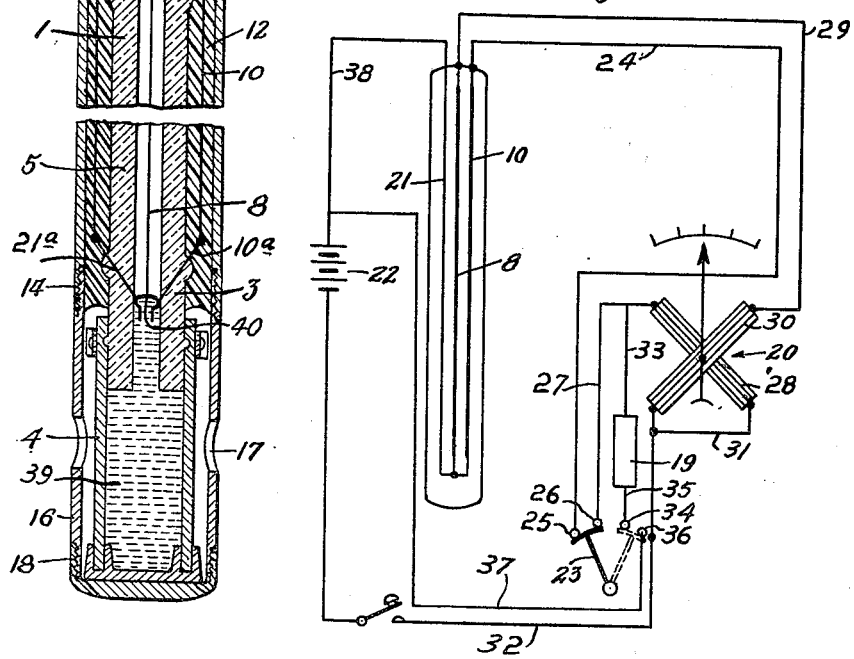

With the foregoing in mind, the objects and advantages of the invention will be more fully appreciated in connection with the following description of a preferred embodiment when considered in connection with the accompanying more or less schematic drawings wherein Figure 1 represents a longitudinal section through equipment embodying my invention;

Figure 2 shows the circuit diagram of the instrument for the measurement of pressure; and Figure 3 shows the circuit diagram for the measurement of pressure and temperature with the indicating apparatus of the present invention.

According to my invention a plurality of pipes having different lengths and different diameters are arranged in succession or in a series. The pipes are sealed at one end and at the opposite end they terminate in a mercury container made of elastic material. Within the pipes I provide a wire of suitable resistance material and on the outside of the pipes I provide another wire of the same properties leading from the mercury to the upper end of the series of pipes. The pipes are surrounded by a protective casing lined with plastic material with the wire at the outside of the pipes imbedded in such plastic material. A lead-in wire 21 to the mercury container also lies within this protective casing.

The design of the casing is such that adjustments and regulations of the apparatus as well as its calibration may be effected and checked by unskilled operators.

The resistance wires are connected with the windings of a crossed-coil or a bridging-coil instrument and form with them the branches of a bridge circuit, the middle branch of which leads from the instrument windings across a battery 22 or, alternatively, across a contactor and circuit breaker and the lead-in wire to the mercury container. An independent resistor is provided for the measurement of the temperature. This resistor may be selectively connected, by means of a switch, in a branch of the bridge circuit, instead of one of the resistance wires, with an instrument winding so that the resistance can be measured by comparison with the value representing a determined temperature.

Because of the ability to measure pressure and temperature with the aid of my instrument, the expansion of the mercury, the pipe system and the gas in the pipes can all be taken into account for the correction of the values of the measured pressures.

The details of the structure I employ are as follows. The gas pressure gage consists of a plurality of fused pipes 1, whose inside diameters vary from one another. They have strong walls and are sealed at one end 2 and are provided at the other end 3 with a mercury-containing receptacle 4, made of elastic material and arranged to transfer external pressure to the mercury 39. The pressure gage is thus hermetically sealed toward the outside and, consequently, spilling or soiling of the mercury is prevented. This calibrated pressure pipe 1 consists, preferably, of three inter-connected pipes 5, 6 and 7, whose lengths and inside diameters are adapted to the various ranges of measurements to be undertaken. In Figure 1 the mercury meniscus 40 is shown in the lower part of the bore of pipe 5. The bottom pipe 5, adjacent to the mercury container 4, serves for the measuring of the low pressure range; the enlarged middle pipe section 6 for the medium pressure range and the narrow top pipe section 7, for the high pressure range. Within the center of this pipe combination there is disposed a very thin resistance wire 8, e.g., a platinum wire, that portion of which is not short-circuited by the mercury, being adapted to transfer the resistance effect across the cable 9 to the indicator instrument.

The closing of the circuit takes place across platinum wires 10a, 21a which, for the purpose of insulation, are fused in the glass pipe 5. In this connection, the following should be noted. In order to eliminate the disturbing temperature-dependence of the measuring resistor 8, it is advisable to employ resistors which are composed of temperature-independent substances, such as constantan or nickelin. However, due to the ease with which mercury amalgamates, only a small number of metals can be employed, such as iron or platinum, which, however, constitute temperature-dependent resistances. This dependence may be compensated by the introduction of another equally strong resistor 10 of the same material so that one eliminates by way of a bridge circuit this computation element which distorts the result of the pressure-measuring procedure. The wiring diagram according to Figure 2 shows how this can be accomplished in the simplest manner with the aid of a crossed-coil device 20 or a bridging-coil instrument. Since the resistances, expressed in percentages, change in direct proportion to the temperature, the currents that pass through the resistors, also change at the same ratio. This explains why the indication is independent of the temperature at the spot where the measuring is done.

The so-called compensation resistor 10 in the measuring or sounding apparatus, together with the pipe 1, is cast into the plastic lining 12 of a metal casing 11, whereby it is protected from attack by petroleum or other substances, e.g., water. The casing pipe 11 has screw threads 13 and 14 at the top and the bottom. A cap 15 at the top provides passage for the cable and can be screwed in an oil-and-water tight manner on the upper end of the casing pipe 11. The cap 16 at the bottom receives the mercury container 4 and has holes 17 at its sides for the transfer of the pressure of the oil column to the pressure gage. A bottom screw 18, serving for fine adjustment, renders it possible to correct the height of the mercury column in the capillary tube.

The second resistor 10 may be simultaneously employed to determine the temperature of the spot where the measuring is done, by means of change of resistance, if one compares this value of resistance with a temperature-independent constant resistor 19. This temperature-independent resistor may be selectively connected with the crossed-coil device 20 or a bridging-coil instrument. Two possibilities are here given: Either one connects the temperature-independent resistor 19 with one bridge branch, instead of the wire 8 in the apparatus, serving for measurement of the pressure. In the event of such switching, the instrument may also have a calibration in temperature values, which permits, in connection with alternate switchings, the direct reading of pressure or temperature. Or one connects the temperature-independent resistor, instead of the wire 10 serving for measurement of the temperature, with the respective bridge branch. In the latter case, which is shown in Figure 3 of the drawings, the temperature is indicated by the difference of the instrument deflections, for the pressure measurement with the wire 10 in the circuit on the one hand and for the measurement with the resistor 19 in the circuit on the other hand. This circuit diagram is shown in Fig. 3, where one sees in schematic form how it is possible to measure selectively pressure and temperature with the aid of the sounding apparatus across a three-core cable.

In Figure 3 the wire 10 is connected by means of wire 24 with one terminal 25 of switch 23. The terminal 26 with which terminal 25 is interconnected when switch 23 is in the left-hand position is connected by wire 27 to the upper end of the crossed coil 28. Wire 8 is connected by wire 29 with the upper end of crossed coil 30. The lower ends of the crossed coils 28 and 30 are connected with the lower side of the battery 22 by means of wires 31 and 32. The upper end of the resistor 19 is connected by a wire 33 with the upper end of crossed coil 28 and the lower end of resistor 19 is connected to a terminal 34 of switch 23 by means of wire 35. The terminal 36 with which terminal 34 is interconnected when switch 23 is in the right-hand position is connected by wire 37 to the upper side of the battery 22. Wire 21 is also connected to the upper side of battery 22 by means of wire 38.

If the specifications demand a very high degree of exactness of the pressure indication, the determination of the temperature at the spot of measuring may serve to adjust the pressure measurement in a manner known per se, by taking the expansion of the mercury, the glass container and the gas into account.

I claim:

1. A measuring instrument for use in a deep well comprising, an elongated casing adapted for endwise insertion into a well, a generally tubular member within said casing, said tubular member being sealed at the top, a bulb having a flexible wall adapted to be exposed to the pressure of the fluid in the well, the interior of said bulb being in communication with the lower end of the bore of said tubular member, mercury filling said bulb, a first conductor extended within the bore of the tubular member and into the mercury, a second conductor of the same properties and length as the first conductor extended outside of said tubular member but within said casing, the space between the tubular member and the casing being filled with insulating material in which the second conductor is imbedded, and means for comparing the electrical resistance of the first and second conductors.

2. A construction according to claim 1 and further including a lead-in wire imbedded in the insulating material between the tubular member and the casing, said lead-in wire being in electrical contact with the mercury.

3. A construction according to claim 1 in which the casing extends around the bulb, the casing being apertured so as to permit fluid in a well to contact the flexible wall of the bulb.

4. A measuring instrument for use in a deep well comprising, a generally tubular member sealed at the top and at the bottom terminating in a bulb having a flexible wall, an elongated casing surrounding said tubular member and bulb and being adapted for endwise insertion into a well, the casing being apertured so as to permit fluid from the well to contact the flexible wall of the bulb, mercury filling said bulb, a first conductor extended within the bore of the tubular member and into the mercury, a second conductor of the same properties and length as the first conductor extended outside of the bore of the tubular member but within the casing, means for comparing the electrical resistance of the first and second conductors, and means for varying the volume of said bulb.

5. A measuring instrument according to claim 4 in which the bulb includes a pair of telescopically movable members for effecting the variation in the volume of the bulb.

6. A construction according to claim 4 in which the bottom wall of the casing is in the form of a screw cap, and in which one of said telescopically movable members is mounted on said screw cap.

7. A measuring instrument for use in a deep well comprising, an elongated casing adapted for endwise insertion into a well, a generally tubular member within said casing, said tubular member being sealed at the top, a bulb having a flexible wall adapted to be exposed to the pressure of the fluid in the well, the interior of said bulb being in communication with the lower end of the bore of said tubular member, mercury filling said bulb, a plurality of like conductors mounted within the casing, a first of said conductors being extended within the bore of the tubular member and into the mercury, a second of said conductors being insulated from electrical contact with the mercury substantially throughout its length, and means for comparing the electrical resistance of said first and second conductors.

References Cited in the file of this patent

UNITED STATES PATENTS

| | | |
|---|---|---|
| 1,638,814 | Epstein | Aug. 9, 1927 |
| 2,001,368 | Older | May 14, 1935 |
| 2,036,458 | Carlson | Apr. 7, 1936 |
| 2,398,375 | Heenan | Apr. 16, 1946 |
| 2,459,268 | Elkins | Jan. 18, 1949 |
| 2,749,754 | Linahan | June 12, 1956 |

FOREIGN PATENTS

| | | |
|---|---|---|
| 745,839 | Germany | Nov. 30, 1944 |
| 683,742 | Great Britain | Dec. 3, 1952 |
| 1,125,540 | France | July 16, 1956 |